United States Patent Office 3,523,971
Patented Aug. 11, 1970

3,523,971
SYNTHESIS OF ACRYLAMIDES
Giovanni Biale, Fullerton, Calif., assignor to Union Oil Company of California, Los Angeles, Calif., a corporation of California
No Drawing. Filed May 26, 1966, Ser. No. 553,018
Int. Cl. C07c *103/02*
U.S. Cl. 260—561                    10 Claims

ABSTRACT OF THE DISCLOSURE

Oxidative carbonylation of olefins is performed in the presence of alkyl and cycloalkyl amines to produce alpha,beta-unsaturated amides which have the same degree of unsaturation as the reactant olefin and which contain an alkyl or cycloalkyl group substituted on the nitrogen. The invention has application in the production of N-alkyl or N-cycloalkyl acrylamides from ethylene. In a typical embodiment, ethylene, carbon monoxide and oxygen are introduced into a reaction zone containing methanol, palladous chloride, cupric chloride and propylamine. The reaction is performed at about 250° F. and at a pressure of about 900 p.s.i.g. A high yield of N-propyl acrylamide is produced by the reaction.

DESCRIPTION OF THE INVENTION

This invention relates to the preparation of N-substituted alpha,beta-unsaturated amides and in particular relates to a method of oxidative carbonylation of olefins to these amides.

The alpha,beta-unsaturated amides produced by my process are useful as monomers and can be polymerized to polyamides having N-substituents. These polyamides can be used for the various purposes that polyamides are employed, e.g., as adhesives, fibers, films, flocculants, thickeners, etc. A potential large scale application is the use of the polymers as thickeners for organic and aqueous solutions and in particular thickeners for aqueous solutions employed in the water flooding of subterranean oil-bearing reservoirs.

The alpha,beta-unsaturated amides are prepared according to my process by oxidative carbonylation of a hydrocarbon alpha olefin. The reaction is practiced by contacting the olefin and carbon monoxide with a substantially anhydrous solution containing a platinum group metal salt and a suitable redox agent capable of maintaining the platinum group salt in its higher valency. The reaction medium also contains a hydrocarbon amide as a reactant and the olefin is carbonylated and reacted with the amine to prepare the N-substituted acrylamide. This reaction results in a reduction of a stoichiometric quantity of the platinum metal catalyst to a lower valence state. The redox agent restores the platinum metal catalyst to its higher valency for reaction with further quantities of the olefin, carbon monoxide and amine. This restoration of activity reduces the redox agent and when all of this agent has been reduced to a lower valency, it is necessary to regenerate the catalyst by contacting the solution with oxygen. In a preferred embodiment, this contacting with oxygen is performed in the same reaction zone as that employed for the olefin and these two reactions are conducted simultaneously. If desired, however, the reaction can be practiced with independent zones; one zone used for the oxidative carbonylation and the other for the regeneration of the catalyst.

Any alpha ethylenically unsaturated hydrocarbon can be used for the reaction, however for ease of reactivity, hydrocarbon alpha olefins having from 2 to about 10 carbons are preferred. Examples of these hydrocarbon olefins are ethylene, propylene, 1-butene, 1-pentene, 1-hexene, 3-methylhexene-1, 1-octene, 1-nonene, 1-decene, etc. Of the aforementioned, the hydrocarbon olefins having from 2 to 5 carbons are preferred and ethylene is the most preferred because of the established value of the acrylamides produced by the reaction with the ethylene. The reaction with the higher molecular weight olefins produces alpha,beta-unsaturated amides such as the N-ethyl crotonic amide from propylene, N-isopropyl alpha-pentenoic amide, N-butyl alpha-hexenoic amide, N,N-dibutylacrylamide, etc.

The amine reactants can be any aliphatic or alicyclic saturated hydrocarbon secondary or primary amine. For a diversified range of properties, amines having alkyl groups of 1 to about 6 carbons can be employed. The higher molecular weight amines (alkyl group of 3 to 6 carbons) can be employed in the preparation of a highly organophilic amide. The low molecular weight amines, those having from about 1 to about 3 carbons, can be used to prepare a hydrophilic amide product. Accordingly, the polymer obtained by the polymerization of the product can be tailored for a variety of uses, e.g., water or oil-soluble polymers can be readily obtained. Examples of suitable amines that can be used in the process include the following: methyl amine, ethyl amine, diethyl amine, propyl amine, diisopropyl amine, butyl amine, amyl amine, diamyl amine, hexyl amine, cyclohexylamine, methylcyclohexyl amine, cyclobutyl amine, cyclopentyl amine, etc. Of the aforementnioned, amines having from 1 to 3 carbons are preferred such as methyl, ethyl, isopropyl, etc.

The catalyst employed in the reaction is a platinum group metal which in its active state is present as a dissolved salt. During the reaction the ions of the platinum group metal are reduced to the free metal; however, the metal is reoxidized to the active state by the redox agent employed in the reaction. The platinum group metal can be of the palladium subgroup or the platinum subgroup, i.e., palladium, rhodium, ruthenium or platinum, osmium or iridium. While all of these metals are active for the reaction, I prefer palladium because of its greater activity. The platinum group metal can be employed in an amount between about 0.001 and about 5.0 weight percent of the liquid reaction medium; preferably between about 0.04 and about 2.0 weight percent. The platinum group metal can be added to the reaction medium as a finely divided metal, as a soluble salt, or as a chelate. Preferably the metal is added in its most oxidized form to thereby avoid the immediate consumption of redox agent.

Examples of suitable forms of the catalyst therefore are the soluble salts or chelates such as the halides and carboxylates of the metals, e.g., palladium chloride, rhodium acetate, ruthenium bromide, osmium propionate, iridium benzoate, palladium isobutyrate, palladium bromide, palladium nitrate, etc. Examples of suitable chelates are palladium acetylacetonate and complexes of the platinum group metal ions with such conventional chelating agents as ethylene diamine tetraacetic acid, citric acid, etc.

To facilitate the rate of oxidation by rendering the reduced form of the platinum group metal more readily oxidizable, I prefer to employ a reaction medium that contains a soluble halide, e.g., a soluble bromide or chloride. These materials can be added as elemental chlorine or bromine and will be reduced to the halide form; however, it is preferred to employ less volatile halogen compounds such as the hydrogen, alkali metal or ammonium halides, e.g., hydrogen chloride, hydrogen bromide, cesium chloride, potassium bromide, sodium bromide, lithium chloride, ammonium bromide, ammonium chloride, etc. Also any of the aforementioned platinum group metals can be added as the halide salt to thereby supply a portion of the bromide or chloride and the hereafter mentioned multivalent metal redox salts can also be added as the halides.

Sufficient of any of the aforementioned halide compounds can be added to provide between about 0.05 and about 5.0 weight percent of a soluble halide in the reaction zone; preferably amounts are employed to provide a concentration of halides between about 0.1 and about 3.0 weight percent. The amount of halide so employed is preferably in excess of the stoichiometric quantity necessary to form the halide of the most oxidized state of the platinum group metal, e.g., in excess of two atomic weights of halide per atomic weight of palladium present since this excess halide is desirable to provide a more rapid rate of reaction.

The reaction medium is also provided with a redox agent which is capable of oxidizing the reduced form of the platinum group metal to the active higher valency. In general, any mutlivalent metal salt having oxidation potential higher, i.e., more positive, than the platinum metal in the solution, can be used. Typical of such are the soluble salts of the multivalent metal ions such as the carboxylates, e.g., propionates, benzoates, acetates, etc.; nitrates; sulfates; halides, e.g., bromides or chlorides, of copper or iron. Of these the cupric salts are preferred and the cupric halides are most preferred. The multivalent metal ion salt is added to the reaction medium to provide a concentration of the metal cations therein between about 0.1 and about 10 weight percent; preferably between about 0.5 and about 3.0 weight percent.

Nitrogen oxides also function as redox agents in this reaction. The nitrogen oxides can be added to the reaction zone as a soluble nitrogen oxide salt such as a soluble nitrate or nitrite, e.g., an alkali metal, alkaline earth metal or ammonium nitrate or nitrite can be added to the reaction medium alone or with any of the aforementioned redox metal salts to provide the necessary concentration of redox agent to permit a continuous process. The nitrogen oxide when so employed should comprise about 0.01 and about 3.0 weight percent of the reaction medium; preferably between about 0.1 and about 1.0 weight percent, calculated as nitrogen oxide. The nitrogen oxide can also be added to the reaction zone by introducing nitrogen oxide vapors with the oxygen during the oxidation and this introduction results in the fixation of a sufficient quantity of the nitrogen oxide as a soluble salt in the reaction medium. Examples of nitrogen oxides that can be introduced with the oxygen during regeneration of the solution include nitric oxide, nitrogen dioxide, nitrogen tetraoxide, etc. As previously mentioned, however, the nitrogen oxide is most conveniently added as a soluble salt such as sodium nitrate, lithium nitrate, potassium nitrite, magnesium nitrate, calcium nitrate, ammonium nitrate, etc.

The reaction is performed under liquid phase conditions in the presence of an organic liquid which has a solvency for the catalyst and which, preferably, is inert to the reaction conditions. Various organic liquids can be employed for this purpose such as alcohols, sulfoxides, sulfones, amides, acetyl chlorides, ketones, ethers, esters and carboxylic acids. Illustrative of the last class of solvents are formic, acetic, propionic, butyric, isobutyric, pentanoic, hexanoic, helptanoic, octanoic, benzoic, toluic, phthalic acids, etc. Of these the fatty carboxylic acids having from 2 to about 8 carbons are preferred.

Other organic solvents that can be employed include the alkyl and aryl sulfoxides and sulfones such as dimethylsulfoxide, propylethylsulfoxide, diisopropylsulfone, decylmethylsulfoxide, butylamylsulfone, diisooctylsulfoxide, diphenylsulfoxide, methylbenzylsulfone, etc.

Another class of organic solvents that have sufficient solvency for the catalyst salts and that are inert to the oxidative carbonylation are various amides such as formamide, dimethyl formamide, ethylisopropyl formamide, acetamide, n-phenylacetamide, N,N-dipropylacetamide, isobutyramide, N-ethylisobutyramide, isovaleric amide, N,Ndimethylisovaleric amide, isocaprylic amide, N,N-methyl - n - caprylic amide, N-propylene - n - heptanoic amide, iso-undecyclic amide, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyly ether, dichloroethyl ether, ethylene glycol diisoamyl ether, diethylen glycol diethyl ether, ethylbenzyl ether, diethylene glycol diethyl ether, diethylene glycol dimethyl ether, ethylene glycol dibutyl ether, ethylene glycol diphenyl ether, triethylene gylcol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

The reaction can be performed under relatively mild conditions, e.g., temperatures from about 30° to about 300° C.; preferably from about 70° to about 125° C. are employed. The reaction pressure employed is sufficient to maintain a liquid phase and preferably, when gaseous olefins are employed, superatmospheric pressures are used to increase the solubility of the olefin in the reaction medium and thereby accelerate the reaction rate. Accordingly, pressures from about atmospheric to about 200 atmospheres or more can be used and pressures from about 10 to about 100 atmospheres are preferred.

The carbon monoxide is introduced into contact with the reactants at a sufficient rate to insure that the desired carbonylation occurs. Relative rates of the carbon monoxide based on the olefin can be from 1:10 to 10.1 mols per mol of olefin. Preferably, rates from about 1:5 to about 5:1 and, most preferably, from about 1:2 to 2:1 are employed.

The reaction can be practiced in a batchwise or continuous fashion. In a batch process the olefin and carbon monoxide can be charged to the reaction zone and sufficient time permitted for the reaction to occur. The batch experiment can be extended by the simultaneous or intermittent introduction of oxygen during the reaction so as to regenerate the redox agent to a higher valency which, in turn, oxidizes the reduced platinum group metal catalyst to its active, higher valency. The products of the oxidation can be periodically removed or can be accumulated in the reaction zone until the water content of the reaction zone has built up to an undesirably high level. The reaction as previously mentioned is performed under substantially anhydrous conditions. Accordingly, the reaction solvent should not contain an excess of 20 weight percent water. Preferably, the solvent contains less than 10 weight percent water and, most preferably, less than 5 weight percent water.

In a continuous processing the olefin and carbon monoxide are introduced as reactant streams into contact with the anhydrous reaction medium. The reaction medium is contained within a suitable zone and the product can accumulate therein or, if desired, a portion of the liquid contents of the reaction zone can be continuously removed and processed for the recovery of the desired product. The reaction solvent and catalyst contained within this removed stream is recovered from the product distillation zone as a bottoms stream which is recycled to the reaction zone.

The activity of the catalyst for the oxidative carbonylation can be maintained by contacting of the solution with oxygen. Any suitable source of elemental oxygen can be used such as a relatively pure stream of oxygen or oxygen diluted with various inerts, e.g., air, oxygen and nitrogen mixtures, oxygen and air mixtures, etc. This contacting can be performed in the same reaction zone in which the oxidative carbonylation is performed, or if desired, the oxidation can be performed in an independent zone. This is achieved by withdrawing a portion of the reaction medium from the reaction zone and before or after product recovery passing the withdrawn portion of the reaction zone liquid into a second reaction zone wherein the liquid is contacted with oxygen.

The regeneration of the catalyst when performed in a separate or independent zone is achieved by contacting the catalyst at relatively mild conditions comparable to those employed in the reaction zone used for the oxidative carbonylation, e.g., temperatures from about 30° to about 300° C.; preferably from about 100° to about 200° C. The reaction pressure employed is sufficient to maintain a liquid phase and preferably is sufficient to provide an attractive rate of oxidation of the reduced solution, e.g., pressures from about atmospheric to about 200 atmospheres can be used, preferably from about 10 to about 100 atmospheres. Preferably the pressure employed is approximately equal to that employed in the oxidative carbonylation reaction zone.

As previously mentioned, a preferred embodiment of my invention comprises the simultaneous oxidation of the catalyst solution by the introduction of oxygen into the oxidative carbonylation reaction zone concurrently with the introduction of the olefin and carbon monoxide. In this embodiment a pure oxygen stream is preferably employed so that the unconverted gases recovered from the reaction zone can be recycled without the necessity of removal of large amounts of inert gases. The rate of oxygen introduced into the oxidative carbonylation reaction zone can be controlled in response to the free oxygen content of the gaseous effluent from the reaction zone or the vaporous phase within the reaction zone itself. Preferably, this gas is continuously analyzed and the relative rate of oxygen introduction into the carbonylation reaction zone is controlled to maintain the elemental oxygen content of the vapor phase less than about 2 and most preferably less than about 1 volume percent. When ethylene is carbonylated to an acrylamide in the reaction zone, the relative rate of introduction of oxygen will generally be from about 5 to about 35 volume percent and the excess ethylene is removed from the reactor and recycled for further contact.

During the oxidation a portion of the liquid reaction medium can be withdrawn and distilled to recover the desired products from the reaction medium that contains the catalyst component which is recycled for further contacting in the reaction zone. The product is recovered from the reaction medium by any suitable technique such as atmospheric distillation, vacuum distillation, azeotropic distillation, solvent extraction, etc. It is understood that the particular choice of recovery technique is determined primarily by the nature of the final product, as apparent to those skilled in the art.

The following examples will serve to illustrate the practice of the invention and to demonstrate results obtainable thereby:

EXAMPLE 1

Into a half-gallon, titanium-lined autoclave was introduced 200 milliliters methanol, 200 milliliters trimethylorthoformate, 0.5 gram palladous chloride, 5 gram cupric chloride, 5 grams cuprous chloride and 60 grams propylamine. The autoclave was closed, pressured to 450 p.s.i.g. with ethylene and then to 900 p.s.i.g with carbon monoxide The autoclave was then heated to 250° F. and oxygen was slowly introduced into contact with the liquid contents of the reaction zone. A very fast rate of reaction was observed with oxygen introduction and after 15 minutes a pressure drop of about 250 p.s.i. was observed. The reaction was thereupon discontinued, the autoclave was cooled, depressured, opened and the liquid contents thereof were distilled to recover 28 grams unreacted propylamine, the solvent, and 50 grams of residue which were then vacuum distilled to obtain 33 grams N-propylacrylamide and about 10 grams N,N'-dipropylurea.

EXAMPLE 2

The Example 1 was repeated without trimethylorthoformate to obtain 35 grams N-propylacrylamide with trace amounts of N,N'-dipropylurea.

EXAMPLE 3

Into the autoclave was introduced 400 milliliters methanol, 73 grams diethylamine, 0.5 gram palladous chloride, 5 grams cupric chloride and 5 grams cuprous chloride. The autoclave was closed, pressured to 450 p.s.i.g. with carbon monoxide and then to 900 p.s.i.g. with ethylene. The autoclave contents were heated to 250° F. and oxygen was introduced at 10 p.s.i. increments over a 20 minute reaction period. Upon completion of the reaction period, the autoclave contents were weighed to determine that a 40 gram weight increase had occurred and then distilled to recover 32 grams N,N-diethylacrylamide.

The preceding examples are intended solely to illustrate a mode of practicing the invention and to demonstrate results obtainable thereby. It is intended that the invention be defined by the steps and reagents and their obvious equivalents set forth in the following claims.

I claim:

1. The oxidative carbonylation of an alpha alkene having from 2 to about 10 carbons to produce an alpha,-beta-unsaturated amide of the same degree of unsaturation as said alkene and having an N-alkyl or cycloalkyl substituent which comprises introducing the alkene and carbon monoxide into contact with a substantially anhydrous reaction medium containing an amine selected from the class consisting of aliphatic and alicyclic primary and secondary hydrocarbon amines having alkyl and cycloalkyl groups of 1 to about 6 carbons and a catalyst consisting of a soluble chloride, bromide, $C_2$–$C_6$ carboxylate or chelate selected from the class consisting of acetylacetonate, citric acid and ethylene diamine tetraacetic acid chelates of palladium in an elevated oxidation state and a redox agent selected from the class consisting of ammonium, alkali metal, alkaline earth metal nitrites and nitrates and soluble salts of iron and copper, maintaining the temperature of the reaction medium between about 30° and 300° C. and sufficient pressure between about atmospheric and 200 atmospheres to maintain liquid phase conditions to thereby reduce said Group VIII noble metal catalyst and redox agent to a lower valency and contacting said reaction medium with oxygen to oxidize said catalyst to its active, higher valency.

2. The oxidative carbonylation of claim 1 wherein said alkene is ethylene and said product is a N-substituted acrylamide.

3. The oxidative carbonylation of claim 2 wherein said amine is methylamine.

4. The oxidative carbonylation of claim 1 wherein said redox agent is a cupric halide.

5. The oxidative carbonylation of claim 3 wherein said ethylene and carbon monoxide are introduced at relative rates of from 10:1 to about 1:10.

6. The oxidative carbonylation of claim 1 wherein said reactive medium is maintained at a temperature between about 70° and about 125° C.

7. The oxidative carbonylation of claim 1 wherein said reaction medium also contains sufficient soluble chloride or bromide ions to provide at least two atomic weights of halide per atomic weight of said palladium.

8. The oxidative carbonylation of claim 7 wherein the reaction medium contains between about 0.05 and 5.0 weight percent of a hydrogen, alkali metal or ammonium chloride or bromide.

9. The oxidative carbonylation of claim 1 wherein said palladium is present in an amount between about 0.001 and 5.0 weight percent of the liquid reaction medium.

10. The oxidative carbonylation of claim 4 wherein said reaction medium is maintained at a temperature between about 70° and 125° C. and at a pressure from about 10 to 100 atmospheres.

References Cited

UNITED STATES PATENTS

| 3,318,906 | 5/1967 | McKeon et al. | 260—326.5 |
| 3,161,672 | 12/1964 | Zachry et al. | 260—486 |
| 2,542,766 | 2/1951 | Gresham | 260—561 |
| 3,397,225 | 8/1968 | Fenton | 260—486 |
| 3,338,961 | 8/1967 | Closson et al. | 260—544 |

FOREIGN PATENTS 628,659  9/1949  Great Britain.

ALEX MAZEL, Primary Examiner

J. A. NARCAVAGE, Assistant Examiner

U.S. Cl. X.R.

252—412